United States Patent Office 3,105,748
Patented Oct. 1, 1963

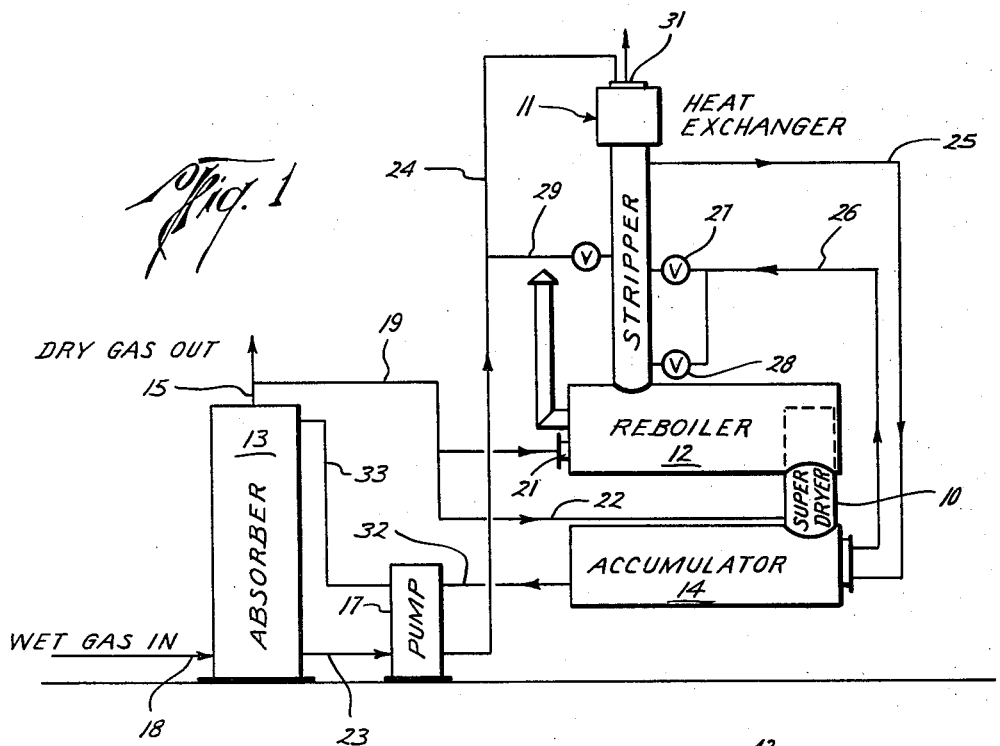
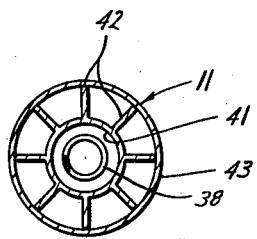
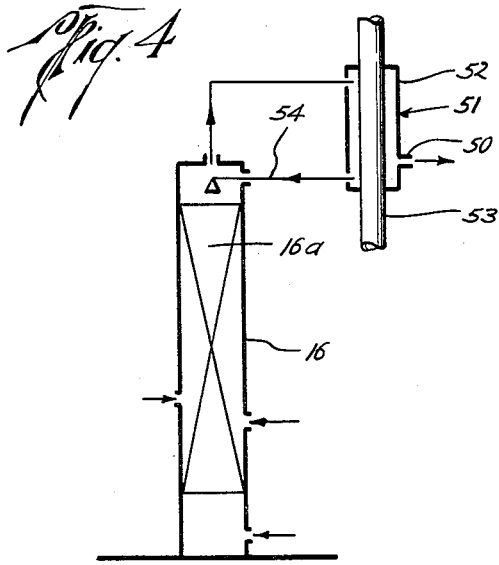
Willi Stahl
INVENTOR.
BY J. Vincent Martin
Joe E. Edwards
M. Harvey Gay
ATTORNEYS

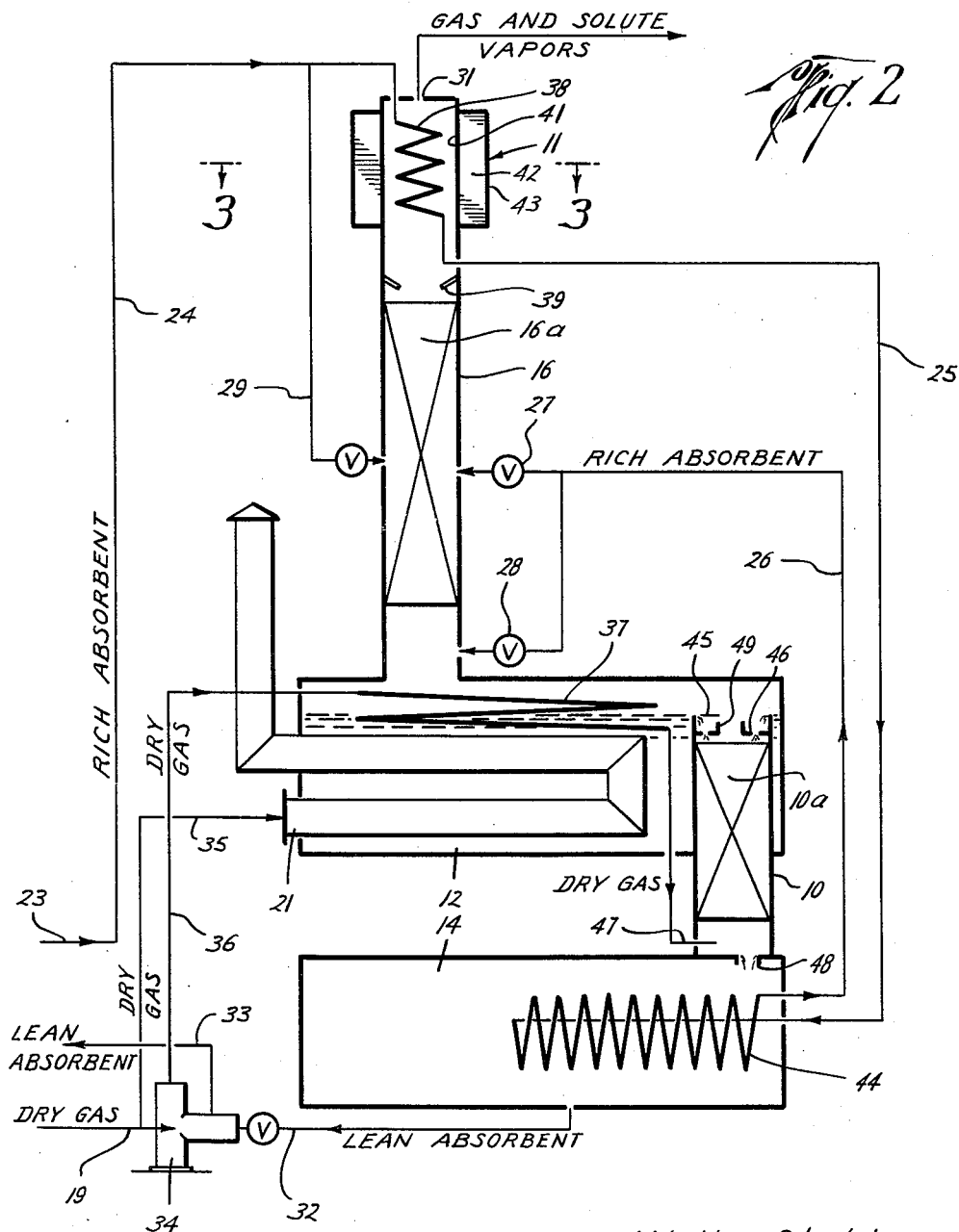

3,105,748
METHOD AND SYSTEM FOR DRYING GAS AND RECONCENTRATING THE DRYING ABSORBENT
Willi Stahl, Houston, Tex., assignor to The Parkersburg Rig & Reel Company, Houston, Tex., a corporation of West Virginia
Filed Dec. 9, 1957, Ser. No. 701,529
25 Claims. (Cl. 55—32)

This invention relates to a liquid absorbent system and method and more particularly to a system and method of the type used in removing undesirable compounds from streams, as for instance water from natural gas. In one important aspect it provides a method and system for reconcentrating the absorbent to a greater degree than has heretofore been possible. In another important aspect it relates to a method and system of preventing excessive absorbent losses in reconcentrating an absorbent where excessive amounts of gas are present.

This invention was particularly devoloped for use in reconcentrating glycol and, therefore, the detailed description of the method and system will relate particularly to a glycol drying system for natural gas. However, it will be understood that the invention is useful in any stream treating system employing a liquid absorbent in which the liquid absorbent is normally reconcentrated by vaporizing the solute.

It is well known to dry a natural gas stream by passing it in intimate contact with a liquid desiccant or absorbent such as triethylene or diethylene glycol.

It is also well known that the water dewpoint depression of the gas stream depends, to a great extent, on how lean a solution of the liquid absorbent can be obtained when that solution is reconditioned. Of course the amount of water which can be removed from a gas stream by a liquid absorbent is dependent upon the degree to which the water dewpoint of the stream can be depressed.

With the conventional reconcentrating equipment of the vapor type, the absorbent cannot be completely reconcentrated. Conventional methods depend upon heat for reconcentration. The temperature to which glycol can be heated without decomposing is limited. Therefore, all water cannot be driven off. A substantial percentage of reconcentration is possible, but heretofore conventional equipment and methods have not approached 100% reconcentration. These conventional methods and equipment are satisfactory where the temperature of the gas stream to be dried is low or pressures are high and a relatively small water dewpoint depression of the gas stream will remove the desired amount of water. However, where temperatures are high or pressures are low, there are many instances in which conventional liquid absorbent equipment and methods will not remove a sufficient amount of water. As the gas pipeline companies specify the amount of water permissible in the gas and refuse to accept gas having an excess water content, it is frequently necessary to use the more expensive dry desiccant methods of treating the natural gas stream.

By this invention there is provided a method and system for treating a gas stream with a liquid absorbent which will remove substantially more water from a gas stream and permit use of a liquid absorbent under conditions where it has not heretofore been usable. Water dewpoint depression approaching twice that obtainable with conventional reboilers is possible. The efficiency of the absorbent system is improved by increasing the percentage of reconcentration of the absorbent. This increase is provided by intimately contacting the liquid absorbent after it leaves the reboiler of the conventional system with a small amount of dried gas. This intimate contact may be provided in any desired way, such as in a packed tower, bubble tower, etc. The partial vapor pressures of the glycol and water in the presence of dry gas is lowered creating a state of unequilibrium at the liquid gas interface. A packed tower, bubble tower, etc., films the liquid lowering the mass transfer resistance of the liquid to release of the water vapors. On the other hand, turbulence in the vessel lowers the gas side mass transfer resistance. There results intimate contacting of gas and liquid and the potential for solute vapor transfer is high.

In working out the method of further reconcentrating liquid absorbent with gas, it was found that the gas so used in combination with the vapors from the reboiler can be excessive for conventional stripping columns without substantially increasing the size of the column. This is a problem which is particularly present in any absorbent regenerator system where excessive gas is present in the reboiler.

By this invention I provide a method and system of providing additional reflux liquid in the conventional stripper column to increase its efficiency so that it will be able to strip substantially all of the absorbent from the solute vapors and gas where an excessive amount of gas is present in the reboiler.

It is an object of this invention to provide a method and system of drying gas with a liquid absorbent which will dry the gas to a greater degree than is possible with the conventional reboiler glycol systems previously used.

Another object is to provide a method and system of drying gas with a liquid absorbent in which the dewpoint depression of the gas stream under a given set of conditions can be depressed further than is possible with conventional liquid absorbent systems resulting in a drier gas.

Another object is to provide a method and system of reconcentrating liquid absorbent in which the absorbent can be reconcentrated to a much higher percentage than is possible with conventional reconcentration systems now in use.

Another object is to provide a method and system of reconcentrating a glycol absorbent in which it is possible to obtain a reconcentration by weight of 99.5% to 99.8% purity as compared to 98.1% which is approximately the maximum percentage obtainable with use of conventional reconcentration equipment when operating below the decomposition temperature for glycol.

Another object is to provide a method and system of treating an absorbent leaving a reboiler to further vaporize solute and increase the concentration of absorbent.

Another object is to provide a method and system of reconcentrating liquid absorbent in which excessive gases in the reboiler can be handled without excessive loss of absorbent.

Another object is to provide a method and system of reconcentrating a liquid absorbent which extends the range of safe operating conditions when a pump operated by a mixture of absorbent and gas from the flow stream absorber is used to thereby avoid excessive losses of absorbent from the reboiler upon changes in operating conditions.

Other objects, features and advantages of this invention are apparent from the specification, the claims and drawings.

In the drawings wherein there is shown by way of illustration several forms of this invention, and wherein like reference numerals indicate like parts:

FIGURE 1 is a schematic view of an absorption drying system constructed in accordance with this invention;

FIGURE 2 is a schematic view of a slightly modified form of this invention;

FIGURE 3 is a view along the lines 3—3 of FIGURE 2; and

FIGURE 4 is a fragmentary view illustrating a modified form of heat exchanger for use with the stripping column of FIGURES 1 or 3.

Referring first to FIGURE 1, there is shown a system for drying a natural gas stream. This system is generally conventional in design with the exception of the addition of the superdrier 10, the new form of heat exchanger 11 and the manner of introducing the rich glycol into the reconcentrator. The system includes the reboiler 12 in which the rich absorbent such as glycol is heated in the conventional manner to vaporize the solute picked up from the gas in the absorber 13.

In a conventional glycol regenerator, the partially reconcentrated absorbent is normally delivered directly from the reboiler to an accumulator such as shown at 14. In accordance with this invention the absorbent is further reconcentrated before it reaches the accumulator.

This further reconcentration is accomplished by intimately mixing the absorbent from the reboiler with dry gas, preferably the natural gas previously dried in the absorber.

The partial water vapor pressure of the glycol-water mixture is reduced in the presence of a dry gas. To efficiently take advantage of this fact and use only a small amount of gas to dry the absorbent, intimate mixing is necessary. This intimate mixing may be accomplished in any desired manner.

Preferably, intimate mixing is carried out in a vessel referred to herein as a superdrier. This vessel is preferably packed with Berl saddles or any other packing which will provide filming of the liquid and turbulence of the gas to give intimate mixing. Of course the superdrier could be provided by a bubble tower or any other means of intimately mixing the liquid and gas. By "superdryer" as the term is used herein, is meant a vessel having some means therein for filming of the liquid and turbulence of the gas to give intimate mixing.

In giving up vapors in superdrier 10 the temperature of the absorbent is reduced and this reduces the amount of cooling necessary in the accumulator 14.

The gas from the superdrier is scrubbed in the stripper 16 and it has been found that this additional gas will under certain conditions overload the conventional stripper and reduce its efficiency. To overcome this objectionable characteristic where the design is such as shown in the drawings, that is where the gas from the superdrier is discharged into the reboiler, a heat exchanger 11 of a more efficient design that the conventional atmospheric reflux head is used. A greater amount of water is condensed. The additional amount of reflux increases the efficiency of the stripper.

It will be noted that the pump 17 is of the type which is operated by a mixture of rich absorbent and gas from the absorber 13. This type of pump uses energy stored in the rich absorbent as it leaves the absorber and some gas to operate the pump. This type of pump results in excessive gases in the reboiler. The combination stripper 16 and improved heat exchanger 11 shown are particularly applicable to this type of pump as they make possible the presence of excessive gases in the reboiler without excessive loss of absorbent.

In the system shown in FIGURE 1, wet gas enters the absorber at 18, is dried as it passes up the absorber and leaves at 15. A portion of the dry gas passes through line 19 to the firebox 21 within the reboiler and another portion passes through line 22 to the superdrier 10. The gas used in the reconcentration of the glycol is a relatively insignificant amount of the gas flowing through the absorber.

The rich absorbent and a small amount of gas leave the absorber 13 through line 23 and operate pump 17. The general theory of operation of this type of pump is that the absorbent and gas will be reduced in pressure and the work resulting from this reduction in pressure will operate pump 17. The rich absorbent and gas leave pump 17 through line 24. This mixture is cool and is passed through heat exchanger 11 to condense some of the vapor leaving stripper 16. The rich glycol and gas then pass through line 25 to a heat exchanger (see FIG. 2) within the accumulator 14 to cool the absorbent in the accumulator. The rich absorbent is then delivered through line 26 to the stripper in the more or less conventional manner through valve 27.

If it is found that additional cooling is needed in the stripper 16 to provide more reflux liquid, the rich glycol may be introduced into the stripper through valve 28 instead of valve 27 and a portion of the cold rich absorbent delivered through line 29 from line 24 directly into the stripper. This cold absorbent will reduce the temperature within the stripper to the desired degree.

Natural gas and water vapors go off from the stripper through the outlet 31 and the absorbent falls into the reboiler where it is heated to vaporize the solute.

After the absorbent has been reconcentrated to the maximum amount in reboiler 12, it is passed through the superdrier 10 in intimate contact with dry gas from line 22 for further drying. Countercurrent flow is preferred for maximum efficiency.

After reconcentration in the superdrier, the absorbent is maintained in the accumulator until needed. Then it is withdrawn through line 32, pressurized in pump 17 and delivered to absorber 13 through line 33.

Referring now to FIGURE 2, the reconcentration system in slightly modified form is illustrated in more detail. In this system the absorbent is circulated by the conventional dry gas operated pump 34. Dry gas for this purpose may be obtained from line 19. Dry gas from line 19 will also pass through line 35 to the firebox 21 to supply heat in the reboiler 12. The pump 34 will withdraw lean absorbent from accumulator 14 through line 32 and after pressurizing, the absorbent is delivered through line 33 to an absorber, such as absorber 13 shown in FIGURE 1. This form of pump is illustrated to make clear that the invention may be practiced with either a gas or absorbent operated pump for circulating the absorbent.

In order to utilize the spent dry gas which operates pump 34, this gas is passed through line 36 to the superdrier 10 and provides the gas for drying the partially reconcentrated absorbent as it passes through the superdrier.

The glycol passing through the superdrier will give up more water vapor if it is maintained at approximately reboiler temperature. Therefore, to avoid chilling the glycol with cold gas, it is preferred to pass the dry gas through a heat exchanger 37 within the reboiler 12 to raise the temperature of the dry gas before it reaches the superdrier 10.

The lean absorbent from line 33 is passed through the absorber 13 where it absorbs water from the gas. The rich absorbent is withdrawn from the absorber through line 23 and conveyed to the heat exchanger 11 through line 24. Within the heat exchanger 11 is a conventional heat exchange coil 38 is provided for indirect heat exchange between the coil rich absorbent and vapors leaving the stripper 16. This will result in a condensing of some of the vapors which will fall into stripper column 16. Due to the presence of coil 38 a greater volume of reflux liquid will be provided than in the case of a conventional atmospheric exchanger. A distributor 39 is provided in the top of the stripper 16 to properly distribute the reflux liquid.

It will be recalled from the preceding discussion that where excessive gases are present in the reboiler 12 the conventional stripper 16 has its efficiency reduced. The efficiency of the stripper is restored by the additional reflux liquid provided by heat exchanger coil 38. In many installations the heat exchange coil 38 will provide sufficient reflux liquid. In some instances additional heat exchange is desirable and for this purpose the heat exchanger 11 may include a conventional atmospheric heat exchanger comprising the annular vessel 41 surrounding coil 38 and a plurality of radially extending fins 42 which are secured to the shell 41 as by welding for maximum heat transfer. Due to the large exposed area provided by fins 42, the heat exchanger is, if unprotected, affected by wind velocity, rain, snow, etc. To protect the heat exchanger, an outer shield 43 is provided. This shield is generally concentric with the vessel 41 and extends the vertical length of fins 42 to protect them against direct windblast. Chimney effect provides for air circulation past the fins.

After leaving the heat exchanger 11, the rich glycol passes through line 25 to a heat exchanger 44 within the accumulator 14. The lean glycol within the accumulator 14 is at too high a temperature for passing through the pumps and absorber, and the heat exchanger 44 reduces this temperature in the conventional manner.

The rich glycol then passes through line 26 and valve 27 to the stripper column 16. As explained above, valve 27 may be closed and the rich absorbent introduced through valve 28 if it is desired to introduce a small amount of cold rich absorbent through line 29. In the stripper the free gas passes up and out through opening 31. The rich absorbent falls into the reboiler 12 and is there concentrated as much as possible by heat.

The percentage reconcentration by heat alone is limited. In the instance of triethylene glycol as an absorbent, the glycol cannot be heated to above around 365 degrees F. At this heat the glycol immediately surrounding the firetube 21 will be about 400 degrees. As triethylene glycol begins to decompose at around 404 degrees and diethylene glycol at 328 degrees, it will be appreciated that a limitation is imposed on the temperature to which the glycol can be raised. A reboiler of the type illustrated in the drawings will reconcentrate triethylene glycol to approximately 98.1% by weight (diethylene glycol approximately 96.7%).

In order to further reconcentrate the glycol leaving reboiler 12, it is passed in intimate contact with a small amount of dry gas to further reconcentrate the absorbent. In the form of invention shown in FIGURE 2, the superdrier for further reconcentrating the absorbent is shown to be partly enclosed within the reboiler. This brings the reboiler 12 and the accumulator 14 closer together. The superdrier may be any desired structure having means therein such as trays or packing which will provide for intimate contact between the partially reconcentrated absorbent passing therethrough with dry gas. Preferably the absorbent and gas are passed in countercurrent flow for maximum efficiency.

The absorbent flows over a wier 45 at the top of the superdrier onto a distributor 46 which distributes the liquid over packing 10a. After the absorbent has been intimately contacted with the dry gas entering the superdrier at 47, the further reconcentrated absorbent passes through opening 48 into the accumulator 14.

The dry gas leaves the top of the superdrier through the outlet 49 in the distributor and passes into the reboiler 12. This dry gas, together with vapors from the absorbent, rise through packing 16a in stripper column 16 where they are scrubbed with reflux liquid to remove absorbent therefrom. As noted above, some of the scrubbed vapors in heat exchanger 11 are returned to the stripper column to provide additional reflux liquid.

Referring now to FIGURE 4, there is shown a slightly modified form of heat exchanger for providing additional reflux liquid for the stripper column 16. In this form of the invention a portion of the vapors leaving the stripper column passes through heat exchanger 51 where it is condensed. The heat exchanger 51 is provided by putting vapor jacket 52 around a pipe 53 which contains relatively cold fluid to cause the vapors to condense. The condensed vapors are returned to the stripper column through line 54 to provide additional reflux liquid. Gas is exhausted through outlet 50. Pipe 53 could be the outlet pipe 36 from the absorber.

In order to illustrate the difference in results obtained with the use of the superdrier as compared to the same structure not employing the superdrier, four examples have been computed. Examples I and II illustrate an operating condition in which the conventional type of reconcentrator could not be utilized as it would not reduce the water content of the gas to a level acceptable by gas transmission companies. Examples III and IV illustrate another condition in which the conventional reconcentration system would be acceptable but show how much more water would be removed from the line by utilizing this invention.

EXAMPLE I

*Contacting Triethylene Glycol With Natural Gas*

Properties of the gas entering the absorber:
Temperature _____ deg. F__ 100
Pressure _____ p.s.i.__ 200
Water content (saturated) _____ lb./MM s.c.f__ 240

|  | Conventional | New [1] |
|---|---|---|
| 1. Reboiler temperature, deg. F | 365 | 365 |
| 2. Glycol percent by weight of dry solution entering absorber | 98.1 | 99.6 |
| 3. Glycol percent by weight of wet solution leaving absorber | 95.6 | 96.85 |
| 4. Difference in concentration of wet and dry glycol, percent | 2.5 | 2.75 |
| 5. Water dewpoint of dry gas leaving absorber, deg. F | 35 | 0 |
| 6. Water dewpoint depression obtained, deg. F | 65 | 100 |
| 7. Water content of dry gas leaving absorber, lb./MM s.c.f | 28.5 | 6.85 |
| 8. Water content in percent of what is accepted by the gas transmission companies, i.e., 7 lb./MM s.c.f | 410 | 98 |
| 9. Amount H$_2$O in excess of allowable water content, lb./MM s.c.f | 21.5 (or 310%) | 0 |
| 10. Amount of water removed, lb./MM s.c.f | 211.5 | 233.15 |

[1] Superdrier added to conventional.

EXAMPLE II

*Contacting Diethylene Glycol With Natural Gas*

Properties of the gas entering the absorber:
Temperature _____ deg. F__ 100
Pressure _____ p.s.i.__ 200
Water content (saturated) _____ lb./MM s.c.f__ 240

|  | Conventional | New [1] |
|---|---|---|
| 1. Reboiler temperature, deg. F | 325 | 325 |
| 2. Glycol percent by weight of dry solution entering absorber | 96.7 | 99.6 |
| 3. Glycol percent by weight of wet solution leaving absorber | 94.25 | 96.8 |
| 4. Difference in concentration of wet and dry glycol, percent | 2.5 | 2.8 |
| 5. Water dewpoint of dry gas leaving absorber, deg. F | 38 | 2 |
| 6. Water dewpoint depression obtained, deg. F | 62 | 98 |
| 7. Water content of dry gas leaving absorber, lb./MM s.c.f | 33.5 | 7.0 |
| 8. Water content in percent of what is accepted by the gas companies, i.e., 7 lb./MM s.c.f | 480 | 100 |
| 9. Amount H$_2$O in excess of allowable water content, lb./MM s.c.f | 26.5 (or 310%) | 0 |
| 10. Amount of water removed, lb./MM s.c.f | 206.5 | 233 |
| 11. Vapor pressure of dry glycol entering the absorber, mm. Hg | 7.2 | [2] 0.33 |
| 12. Vapor pressure of wet glycol leaving the absorber, mm. Hg | 11.5 | 7 |
| 13. Partial water vapor pressure of dry solution entering the absorber, mm. Hg | 7.2 | [3] 0.28 |
| 14. Partial water vapor pressure of wet solution leaving the absorber, mm. Hg | 11.5 | 6.9 |

[1] Superdrier added to conventional.
[2] 0.2 to 0.6 range.
[3] 0.2 to 0.5 range.

EXAMPLE III

*Contacting Triethylene Glycol With Natural Gas*

Properties of the gas entering the absorber:
Temperature_____deg. F__ 100
Pressure_____p.s.i.__ 1200
Water content (saturated)_____lb./MM s.c.f.__ 55

| | Conventional | New [1] |
|---|---|---|
| 1. Reboiler temperature, deg. F | 365 | 365 |
| 2. Glycol percent by weight of dry solution entering absorber | 98.1 | 99.6 |
| 3. Glycol percent by weight of wet solution leaving absorber | 95.6 | 96.85 |
| 4. Difference in concentration of wet and dry glycol, percent | 2.5 | 2.75 |
| 5. Water dewpoint of dry gas leaving absorber, deg. F | 35 | 0 |
| 6. Water dewpoint depression obtained, deg. F | 65 | 100 |
| 7. Water content of dry gas leaving absorber, lb./MM s.c.f. | 7 | 1.7 |
| 8. Water content in percent of what is accepted by the gas transmission companies, i.e., 7 lb./MM s.c.f. | 100 | 24 |
| 9. Amount H₂O in excess of allowable water content | 0 | <0 |
| 10. Amount of water removed, lb./MM s.c.f. | 48 | 53.3 |

[1] Superdrier added to conventional.

EXAMPLE IV

*Contacting Diethylene Glycol With Natural Gas*

Properties of the gas entering the absorber:
Temperature_____deg. F__ 97
Pressure_____p.s.i.__ 1200
Water content (saturated)_____lb./MM s.c.f.__ 55

| | Conventional | New [1] |
|---|---|---|
| 1. Reboiler temperature, deg. F | 325 | 325 |
| 2. Glycol percent by weight of dry solution entering absorber | 96.7 | 99.6 |
| 3. Glycol percent by weight of wet solution leaving absorber | 94.2 | 96.8 |
| 4. Difference in concentration of wet and dry glycol, percent | 2.5 | 2.8 |
| 5. Water dewpoint of dry gas leaving absorber, deg. F | 35 | −1 |
| 6. Water dewpoint depression obtained, deg. F | 62 | 98 |
| 7. Water content of dry gas leaving absorber, lb./MM s.c.f. | 7 | 1.7 |
| 8. Water content in percent of what is accepted by the gas transmission companies, i.e., 7 lb./MM s.c.f. | 100 | 24 |
| 9. Amount H₂O in excess of allowable water content | 0 | <0 |
| 10. Amount of water removed, lb./MM s.c.f. | 48 | 53.3 |
| 11. Vapor pressure of dry glycol entering the absorber, mm. Hg | 7.2 | [2] 0.33 |
| 12. Vapor pressure of wet glycol leaving the absorber, mm. Hg | 11.5 | 7 |
| 13. Partial water vapor pressure of dry solution entering the absorber, mm Hg | 7.2 | [3] 0.28 |
| 14. Partial water vapor pressure of wet solution leaving the absorber, mm. Hg | 11.5 | 6.9 |

[1] Superdrier added to conventional.
[2] 0.2 to 0.6 range.
[3] 0.2 to 0.5 range.

From the above examples it will be noted that at best the difference in concentration between the conventional and new system is only .25% to 0.3%. Yet, the dewpoint depression in the new system is almost twice that of the old system. Of course the amount of dewpoint depression directly determines the amount of water content in the dry gas leaving the absorber. Note from these examples that both at low and high pressures, the amount of water in the dry gas leaving the absorber in the new system is approximately one-fourth of the amount of water in the dry gas leaving the absorber in the old system. These figures illustrate a well-known phenomenon of liquid absorbent, i.e. that the capacity to absorb is much greater with a substantially pure absorbent than with one which is less than pure.

The partial water vapor pressure of triethylene glycol is not known. However, it is believed that the ranges given for diethylene glycol would be indicative of the ranges for triethylene glycol. These partial water vapor pressures also illustrate the substantial purity of the dry absorbent entering the absorber.

From these examples it will be seen that conventional equipment is not usable to dry 200 lbs. gas at 100 deg. F. The water content of the dry gas is far in excess of the amount acceptable to pipeline transmission companies. On the other hand, using this invention the same gas can be dried to an acceptable water content with triethylene glycol and to a slightly greater water content with diethylene glycol. In the case illustrated in Examples I and II, the past practice has been to employ the more expensive dry desiccant method of drying gas. This invention will permit use of the liquid desiccant method with its resulting saving.

In Examples III and IV, the conventional method of drying gas could be used, as the water content of the dried gas would be generally acceptable. However, it is pointed out that by this method the water content is reduced to a very low figure and would be much more acceptable to pipeline transmission companies in very cold regions where a water content of 7 lb./MM s.c.f. will frequently be troublesome. Furthermore, we can use diethylene glycol in many cases, whereas only triethylene glycol would be good enough with the conventional type of equipment. This means substantial savings as the price of diethylene glycol is about 80% the price of triethylene glycol.

From the above it will be seen that the objects of this invention have been attained. While the gas drying step is shown to be carried out in a vessel which extends into the reboiler, it is of course apparent that this construction is for convenience only and that the vessel could be separate from the reboiler. While a countercurrent flow packed tower or bubble tower is preferred, any desired means of contacting the absorbent after it leaves the reboiler may be utilized which will intimately contact the absorbent and gas. Of course the gas from this step is preferably passed through the stripper for the reboiler to simplify the design and avoid unnecessary expense. However, this gas could be scrubbed in a separate stripper if desired.

The foregoing disclosure and description of the invention is illustrative and explanatory thereof and various changes in the size, shape and materials, as well as in the details of the illustrated construction, may be made within the scope of the appended claims without departing from the spirit of the invention.

With some concentrations and with high absorber recirculation rates the absorbent concentration percentage may be so high that the vaporization temperature will be above the decomposition temperature for the absorbent. In this instance the reboiler temperature would be maintained below the decomposition temperature and the water vapor will be removed from the absorbent by the gas passing through the superdrier.

For general service conditions it is more efficient to use the reboiler in the conventional manner and further reconcentrate the absorbent in the superdrier. It is apparent, however, that the temperature of the reboiler may be maintained below the vaporization temperature and the superdrier relied upon for removing water vapor. In this instance the end reconcentration of absorbent would depend upon the volume of gas passed through the superdried. This method of operation is contemplated by and is within the scope of the claims.

The specification and claims refer to dry gas for contacting absorbent in the superdrier. It will be understood that dry means non-saturated gas, preferably as dry as possible. Of course the wet gas entering the absorber, when heated to reboiler temperature, will be relatively dry or non-saturated and could be used in the superdrier.

What is claimed is:
1. The method of reconcentrating a liquid absorbent containing a water solute comprising the steps of, heating the absorbent to a temperature at which maximum quantities of solute will be vaporized without decomposing the absorbent, separating the vaporized solute from the absorbent, conducting the partially reconcentrated absorbent to a subsequent treating area, then spreading the partially reconcentrated absorbent into multiple thin films and intimately contacting the partially reconcentrated absorbent with a turbulent stream of dry gas to further reconcentrate the absorbent.

2. The method of reconcentrating a liquid absorbent comprising the steps of, heating the absorbent in a reboiler to a temperature at which maximum quantities of solute will be vaporized without decomposing the absorbent, separating the vaporized solute from the absorbent, conducting the partially reconcentrated absorbent to a subsequent treating area, then spreading the partially reconcentrated absorbent into multiple thin films and intimately contacting the partially reconcentrated absorbent with a turbulent stream of dry natural gas to further reconcentrate the absorbent.

3. The method of reconcentrating a liquid absorbent comprising the steps of, heating the absorbent in a reboiler to a temperature at which maximum quantities of solute will be vaporized without decomposing the absorbent, separating the vaporized solute from the absorbent, conducting the partially reconcentrated absorbent to a superdryer, spreading the partially reconcentrated absorbent into multiple thin films in the superdryer and intimately contacting the filmed absorbent with countercurrent dry natural gas to further reconcentrate the absorbent.

4. The method of reconcentrating a solution of liquid absorbent and liquid solute comprising the steps of, heating the solution to reconcentrate the solution by boiling off vapors, separating said vapors from said liquid solution and stripping absorbent vapors therefrom, conducting the partially reconcentrated solution to a subsequent treating area, then spreading the partially reconcentrated solution into multiple thin films and intimately contacting the filmed partially reconcentrated solution with a dry turbulent gas stream to further reconcentrate the solution.

5. The method of reconcentrating a liquid absorbent comprising, heating the liquid absorbent in a reboiler to a temperature at which maximum quantities of solute will be vaporized without decomposing the absorbent to partially reconcentrate the absorbent, spreading the partially reconcentrated absorbent into multiple thin films and intimately contacting the partially reconcentrated absorbent from the reboiler with a turbulent stream of dry natural gas in a superdryer to further reconcentrate the absorbent, passing the gas from the superdryer and the vapors from the reboiler through a reflux stripper to remove absorbent vapors therefrom, condensing a portion of the solute vapors after they leave the reflux stripper, and returning the condensate to the reflux stripper to provide additional reflux liquid.

6. The method of continuously drying a gas stream with a liquid absorbent comprising the steps of, intimately contacting the gas stream with a liquid absorbent to dry the gas, reconcentrating the rich liquid absorbent by heating the absorbent to a temperature at which maximum quantities of solute will be vaporized without decomposing the absorbent, separating the vaporized solute from the absorbent, conducting the partially reconcentrated absorbent to a subsequent treating zone, then spreading the partially reconcentrated absorbent into multiple thin films and intimately contacting the partially reconcentrated absorbent with a turbulent stream of the previously dried gas to further reconcentrate the absorbent, and repeating the cycle in a continuous operation.

7. The method of continuously drying a gas stream with a liquid absorbent comprising the steps of, contacting the gas stream with a liquid absorbent in an absorber vessel to dry the gas, reconcentrating the rich liquid absorbent by vaporizing a portion of the solute in a reboiler, separating the vaporized solute from the absorbent, then spreading the partially reconcentrated absorbent into multiple thin films and intimately contacting the partially reconcentrated absorbent with a small portion of the previously dried gas in a superdryer to further reconcentrate the absorbent, and repeating the cycle in a continuous operation.

8. The method of reconcentrating glycol comprising the steps of, heating the glycol to vaporize a portion of the solute, separating the vaporized solute from the glycol, conducting the partially reconcentrated glycol to a subsequent treating area, then spreading the partially reconcentrated glycol into multiple thin films and intimately contacting the partially reconcentrated glycol with a turbulent stream of dry natural gas to further reconcentrate the glycol.

9. The method of drying a natural gas stream with glycol comprising the steps of, intimately contacting the gas stream with glycol to dry the natural gas, reconcentrating the rich glycol by heating it to a temperature at which maximum quantities of solute will be vaporized without decomposing the glycol, conducting the partially reconcentrated glycol to a subsequent treating area, then spreading the partially reconcentrated glycol into multiple thin films and intimately contacting the partially reconcentrated glycol with a small portion of the previously dried gas in continuous turbulent motion to further reconcentrate the glycol.

10. The method of reconcentrating a liquid absorbent comprising the steps of, heating the absorbent in a reboiler to vaporize solute, scrubbing the vapors from the reboiler with reflux liquid in a reflux tower to separate absorbent and solute, condensing a portion of the separated solute by passing it in indirect heat exchange relation with cold rich absorbent, returning the condensate to the scrubbing area to provide additional reflux liquid, conducting the partially reconcentrated absorbent to a subsequent treating area, then spreading the partially reconcentrated absorbent into multiple thin films and intimately contacting the partially reconcentrated absorbent with a turbulent stream of dry gas in a superdryer to further reconcentrate the absorbent.

11. An absorbent regenerator comprising, a reboiler in which the rich absorbent is heated to drive off a portion of the solute, an absorbent vapor reflux stripper connected to the reboiler for stripping absorbent vapors from the solute vapors, a superdryer connected to the absorbent outlet of the reboiler to receive and film absorbent therefrom, and a dry gas inlet in the superdryer for supplying dry gas to the superdryer for intimate contact with the filmed absorbent to further reconcentrate the absorbent, said superdryer providing for turbulent flow of the dry gas therethrough.

12. An absorbent regenerator comprising, a reboiler in which the rich absorbent is heated to drive off a portion of the solute, a superdryer connected to the absorbent outlet of the reboiler to receive and film absorbent therefrom, a dry gas inlet in the superdryer for supplying dry gas to the superdryer for intimate contact with the filmed absorbent to further reconcentrate the absorbent, a reflux stripper column receiving vapors and gas from the reboiler and the superdryer and stripping absorbent vapors therefrom, and a heat exchanger in the outlet of the reflux stripper column for conducting vapors in indirect heat exchange relation with cool liquid from the absorber to which the regenerator is connected for condensing a portion of the stripped solute vapors and returning the concentrate to the reflux stripper column to provide reflux liquid.

13. The absorbent regenerator of claim 12 wherein the heat exchanger passes vapors from the reflux stripper in indirect heat exchange relation with cold rich absorbent from the absorber to which the regenerator is connected before the absorbent is introduced into the reboiler.

14. An absorbent regenerator comprising, a reboiler for vaporizing a portion of the solute, an absorbent vapor stripper connected to the reboiler for stripping absorbent vapors from the solute vapors, a superdryer connected at one end to the absorbent outlet of the reboiler for filming the absorbent, a dry gas inlet in the other end of the superdryer for providing dry gas to intimately contact and further reconcentrate the absorbent, said superdryer providing for turbulent flow of the dry gas therethrough in countercurrent flow with the absorbent.

15. The absorbent regenerator of claim 14 wherein a dry gas line extends through the reboiler and is connected to the gas inlet of the superdryer to provide for indirect heat exchange between the dry gas passing to the superdryer and fluid in the reboiler.

16. An absorber system for drying natural gas comprising, an absorber in which a gas stream is dried by a liquid absorbent, a reboiler receiving the rich absorbent from the absorber and vaporizing a portion of the solute to reconcentrate the absorbent, a superdryer connected to the absorbent outlet of the reboiler and filming the absorbent, conduit means between the dry gas outlet from the absorber and the superdryer to supply a small portion of the dry gas from the absorber to the superdryer to further reconcentrate the absorbent, a pump operated by the mixture of rich absorbent and entrained gas passing from the absorber to the reboiler, said pump returning lean absorbent to the absorber, a reflux stripper column receiving gas and vapors from the reboiler, and a heat exchanger in the outlet of the reflux stripper column for passing vapors from the column in indirect heat exchange relation with cold rich absorbent flowing from the absorber to the reboiler for condensing a portion of the solute vapors to provide additional reflux liquid in the reflux stripper column.

17. A system for drying natural gas comprising, an absorber in which a gas stream is dried by a liquid absorbent, a reboiler receiving the rich absorbent from the absorber and vaporizing a portion of the solute to reconcentrate the absorbent, a reflux stripper column connected to the reboiler and separating the absorbent and solute vapors generated in the reboiler, a superdryer connected to the absorbent outlet of the reboiler and filming the absorbent, and conduit means between the dry gas outlet from the absorber and the superdryer to supply a small portion of the dry gas from the absorber to the superdryer to further reconcentrate the absorbent.

18. An absorber system for drying gas comprising, an absorber in which a gas stream is dried by a liquid absorbent, a reboiler receiving the rich absorbent from the absorber and vaporizing a portion of the solute to reconcentrate the absorbent, a superdryer connected to the absorbent outlet of the reboiler and filming the absorbent, conduit means between the dry gas outlet from the absorber and the superdryer to supply a small portion of the dry gas from the absorber to the superdryer to further reconcentrate the absorbent, a reflux stripper column receiving vapors from the reboiler and gas from the superdryer and stripping absorbent therefrom, and a heat exchanger at the outlet of the reflux stripper column conducting the cold rich absorbent from the absorber in indirect heat exchange with the gas and vapors from the stripper column to condense a portion of the vapors from the reflux stripper column to provide additional reflux liquid.

19. An absorber system for drying gas comprising, an absorber in which a gas stream is dried by a liquid absorbent, a reboiler for reconcentrating the rich absorbent, a reflux stripper column for scrubbing absorbent from vapors generated in the reboiler, a connection between the rich absorbent outlet of the absorber and the stripper column for introducing a portion of the cool rich absorbent into the reflux stripper column to reduce its temperature, a second connection between the rich absorbent outlet of the absorber and the reflux stripper column, a heat exchanger for increasing the temperature of the absorbent passing through the second connection to the column, a superdryer connected to the absorbent outlet of the reboiler and filming the absorbent, and conduit means between the dry gas outlet of the absorber and the superdryer to supply a small portion of the dry gas from the absorber to the superdryer to further reconcentrate the absorbent.

20. An absorber system for drying gas comprising, an absorber in which a gas stream is dried by a liquid absorbent, a reboiler receiving the rich absorbent from the absorber and vaporizing a portion of the solute to reconcentrate the absorbent, a superdryer connected to the absorbent outlet of the reboiler and filming the absorbent, conduit means between the absorber and the superdryer to supply a small portion of the gas from the absorber to the superdryer to further reconcentrate the absorbent, a reflux stripper column receiving vapors from the reboiler and gas from the superdryer and stripping absorbent therefrom, and a heat exchanger at the outlet of the reflux stripper column conducting the cold, rich absorbent from the absorber in indirect heat exchange with the gas and vapors from the stripper column to condense a portion of the vapors from the reflux stripper column to provide additional reflux liquid.

21. A system for drying natural gas comprising, an absorber in which a gas stream is dried by a liquid absorbent, a reboiler receiving the rich absorbent from the absorber and vaporizing a portion of the solute to reconcentrate the absorbent, a reflux stripper column connected to the reboiler and separating the absorbent and solute vapors generated in the reboiler, a superdryer connected to the absorbent outlet of the reboiler and filming the absorbent, and conduit means between the absorber and the superdryer to supply a small portion of the gas from the absorber to the superdryer to further reconcentrate the absorbent.

22. The method of reconcentrating a solution of liquid absorbent and liquid solute comprising the steps of, heating the solution to reconcentrate the solution by boiling off vapors, separating said vapors from said liquid solution and stripping absorbent vapors therefrom, conducting the partially reconcentrated solution to a subsequent treating area, then intimately contacting the partially reconcentrated solution with a dry gas stream to further reconcentrate the solution.

23. The method of reconcentrating a solution of liquid absorbent and liquid solute comprising the steps of, heating the solution to reconcentrate the solution by boiling off vapors, separating said vapors from said liquid solution and stripping absorbent vapors therefrom, conducting the partially reconcentrated solution to a subsequent treating area, then passing said solution in intimate countercurrent contact with a dry gas stream in said treating area to further reconcentrate the solution.

24. The method of reconcentrating a solution of glycol absorbent and water comprising the steps of, heating the solution to reconcentrate the solution to a concentration of at least approximately 97% by weight glycol absorbent by boiling off vapors, separating said vapors from said liquid solution and stripping glycol absorbent therefrom, conducting the partially reconcentrated solution to a subsequent treating area, then spreading the partially reconcentrated solution into multiple thin films and intimately contacting the filmed partially reconcentrated solution with a dry turbulent gas stream to further reconcentrate the solution.

25. The method of reconcentrating a solution of triethylene glycol and water comprising the steps of, heating the solution to reconcentrate the solution to a concentration of at least approximately 98% by weight triethylene glycol by boiling off vapors, separating said vapors from said liquid solution and stripping triethylene vapors therefrom, conducting the partially reconcentrated solution to a subsequent treating area, then spreading the partially reconcentrated solution into multiple thin films and intimately contacting the filmed partially reconcentrated solution with a dry turbulent gas stream to further reconcentrate the solution.

References Cited in the file of this patent

UNITED STATES PATENTS

| | | |
|---|---|---|
| 2,085,028 | Kelly | June 29, 1937 |
| 2,162,158 | Coly | June 13, 1939 |
| 2,280,073 | Hall | Apr. 21, 1942 |
| 2,428,643 | Young | Oct. 7, 1947 |

OTHER REFERENCES

"Dehumidifying and Air Sterilization With Triethylene Glycol," Heating and Ventilating, January 1946, pages 78 to 80.